Dec. 10, 1957 J. L. WILLIAMS Re. 24,401

STOCK VALVE

Original Filed Sept. 24, 1951 2 Sheets-Sheet 1

INVENTOR
JOHN L. WILLIAMS

BY C. B. Birkenbeuel.

ATTORNEY

Dec. 10, 1957 J. L. WILLIAMS Re. 24,401

STOCK VALVE

Original Filed Sept. 24, 1951 2 Sheets-Sheet 2

INVENTOR
JOHN L. WILLIAMS

BY E. B. Birkenbeul.

ATTORNEY

United States Patent Office

Re. 24,401
Reissued Dec. 10, 1957

24,401

STOCK VALVE

John L. Williams, Oswego, Oreg.

Original No. 2,720,379, dated October 11, 1955, Serial No. 248,030, September 24, 1951. Application for reissue May 28, 1957, Serial No. 663,570

3 Claims. (Cl. 251—214)

Matter enclosed in heavy brackets [ ] appears in the original patent but forms no part of this reissue specification; matter printed in italics indicates the additions made by reissue.

This invention relates to gate valves and particularly to bonnetless gate valves.

A bonnetless gate valve includes a gate blade slidably extending through a packing box into a valve body to fit against a valve seat. In order that the gate blade properly fit against the gate seat, the packing box and the seat must be aligned with one another. Heretofore, alignment of the box and seat has been obtained either by machining them into alignment, or by providing a complicated jig to so hold them while the box is welded in place. Both operations are time consuming and expensive.

It is a main object of the present invention to provide a bonnetless gate valve having a packing box unit adjustably mounted on the body in a manner readily permitting the box to be positioned in alignment with the gate blade seat.

This and other objects are accomplished in the manner set forth in the following specification as illustrated in the accompanying drawing, in which.

Like numbers of reference refer to the same or similar parts throughout the several views.

Figure 1:
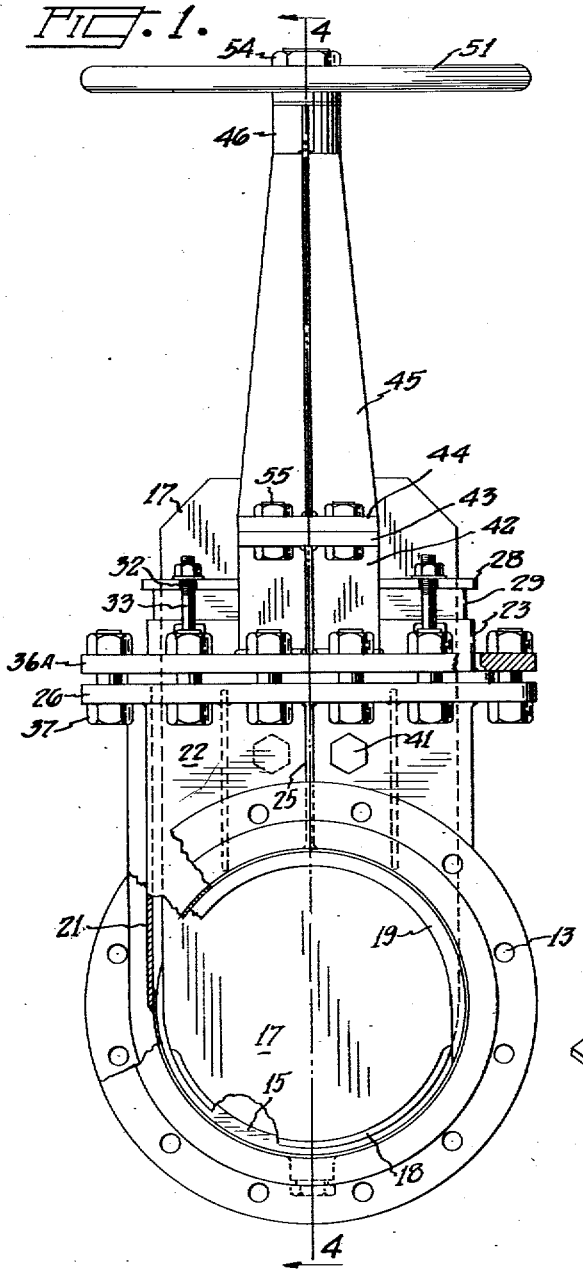
Fig. 1 is an end elevation of a valve with portions broken away in transverse section.

The bonnetless gate valve shown in the drawing has a valve body including a tubular body member 10 providing a fluid flow passage and having end flanges 11 secured thereto by means of the welds 12. The flanges 11 are provided with the usual holes 13 for bolting the valve into a line, or to a vat, or to other pieces of equipment.

At its mid-portion, the tubular body member 10 is formed with a transverse slot 14. A circular ring-shaped valve seat 15 is fitted within tubular body member 10 and secured in position adjacent slot 14 by welds 16.

A gate blade 17, having a chisel shaped edge 18, is slidable across the inner face of the seat 15. Disposed against the opposite side of the gate blade 17 is a partial ring 19 which is secured in place by means of the weld 20.

Figure 5:
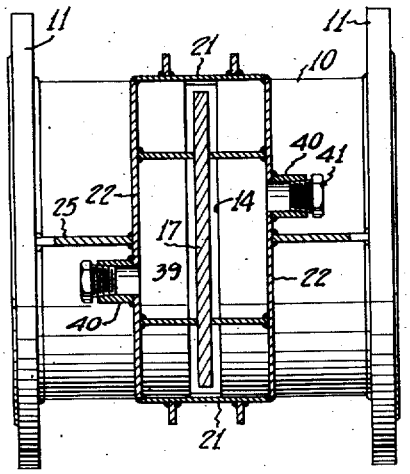
Fig. 5 is a section taken along the line 5—5 in Fig. 4.
Figure 6:
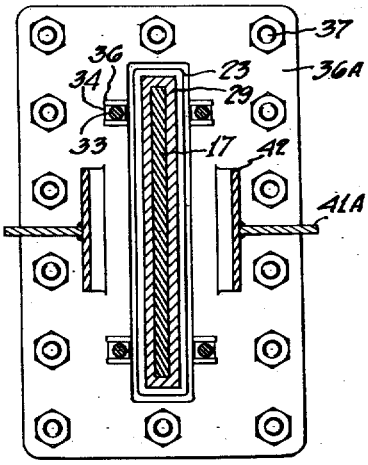
Fig. 6 is a section taken along the line 6—6 in Fig. 4.

The valve body has a chest surrounding slot 14 (Fig. 5) and including parallel side walls 21 joined by parallel end walls 22, the chest walls being secured at their lower ends, as the parts are depicted in Fig. 1, to the tubular body member 10. The slot 14 and the space defined by the chest walls 21 and 22 provide a gate blade channel in the valve body intersecting the fluid flow passage provided by the tubular body member 10. One end portion of the gate blade 17 is arranged within such gate blade channel and the other portion of said gate blade projects from such channel exteriorly of the valve body.

The walls 22 are braced by and connected to the flanges 11 and the tubular body member 10 by means of the central webs 25 which are secured at their upper ends, as the parts are depicted in Fig. 1, to a flange 26 which surrounds and is fixed to the upper ends of the valve chest walls 21 and 22. Fixed to the upper face of flange 26 is a hoop-shaped finished facing 38.

Figure 3:
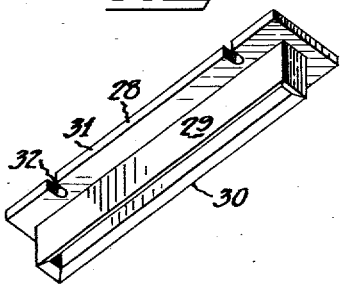
Fig. 3 is a perspective view of the packing gland.
Figure 2:
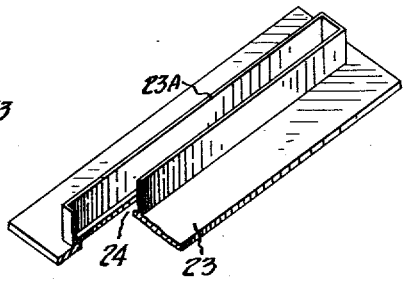
Fig. 2 is a perspective view of the adjustable packing box.
Figure 4:
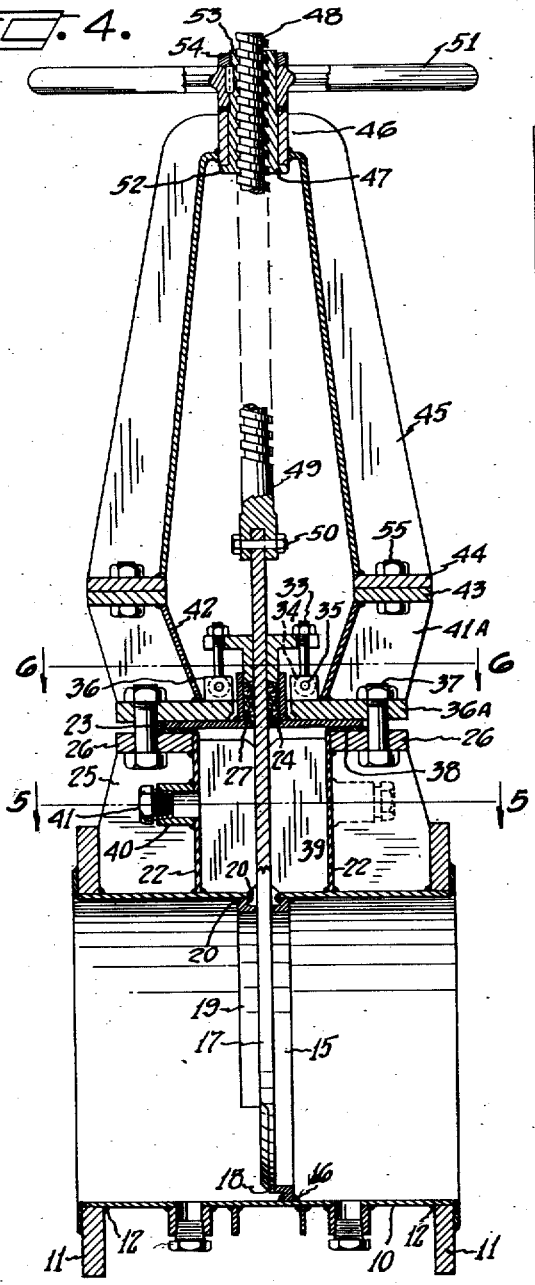
Fig. 4 is a section taken along the line 4—4 in Fig. 1.

Mounted on facing 38 for lateral adjustment relative thereto is a packing box unit including a plate 23 having a slot 24 through which the gate blade 17 projects. A continuous upstanding flange 23–A is fixedly secured to the packing box plate 23 in surrounding relation to the gate blade 17 and in spaced relation to the edges of the slot 24 to form a pocket for the packing 27. The packing gland, as shown in Fig. 3, consists of a flat centrally slotted plate 28 from which projects a rectangular extension 29 whose edges 30 are beveled somewhat, as shown in Fig. 4.

The opposite edges 31 of the plate 28 are provided with slots 32 for eye bolts 33 through whose ends 34 extend pins 35 which are supported by lugs 36 projecting from a clamping member 36–A. The eye bolts 33 may be considered as adjustable mechanism connecting the packing gland to the clamping member 36–A.

The clamping member 36–A is provided with bolts 37 by means of which it is secured to the flange 26 and clamps the packing box plate 23 upon the finished facing 38. The bolts 37 are disposed in spaced relation with respect to the peripheral edges of the packing box plate to permit lateral adjustment of the plate in a direction perpendicular to the plane of the gate blade when the bolts 37 are loosened.

The clamping member 36–A and the bolts 37 constitute a clamping device for releasably securing the packing box plate 23 against the valve body and the clamping device together with plate 23 may be considered as a means for mounting the packing box on the valve body.

Outlet ports 40 are formed on the opposite chest walls 22 and are normally closed by the plugs 41.

The purpose of the outlets 40 is to make it possible to thoroughly cleanse the interior of the valve and remove accumulations of fibre which ordinarily interfere with the operation of the valve.

Projecting from the clamping member 36–A are standards 41–A whose flanges 42 diverge from the gland unit therebetween and extend to the pads 43.

Upon the pads 43 are secured by bolts 55 the feet 44 of an arch 45 in whose closed end 46 is formed a journal for a sleeve 47 having an internal thread to receive the threaded end 48 of a valve actuating rod or stem 49 which is coupled to the gate blade 17 by means of a bolt 50. A hand wheel 51 is keyed to the sleeve 47 whose end 52 is outwardly flanged and whose end 53 is provided with a nut 54.

With a valve of the present invention, the packing box plate 23 thereof may readily be adjusted laterally in a direction at right angles to the plane of the gate blade [so that] *to accommodate the fit of* the gate blade 17 [will properly fit] against the seat. As wear develops between the gate blade 17 and the seat 15, the bolts 37 may be loosened and the packing box laterally shifted to provide again a proper fit between the gate and seat. There is sufficient looseness in the connection between the actuating rod or stem 49 and the gate blade 17 to accommodate such adjustment.

Having described the invention in what is considered to be the preferred embodiment thereof, it is desired that it be understood that the invention is not to be limited other than by the provisions of the following claims.

I claim:

1. A gate valve assembly comprising a valve body having a fluid passage therethrough, a valve seat secured to said body, a gate blade projecting from said valve body and [adjustable laterally to locate] *having* a side surface

[of said blade] in sliding sealing engagement with said valve seat to control the flow of fluid through said passage, a packing box unit having an opening through which said blade projects, a sliding seal between said box and said blade, a surface on said box slidably supported upon a complementary surface of said body whereby said box unit may be shifted upon said body to a position wherein a desired alignment is established between the opening in said box and said valve seat, and means for clamping the last mentioned surfaces into sealing engagement with each other in said position.

2. A gate valve assembly as recited in claim 1 including means upon said valve body for actuating said gate blade, said means being adapted to accommodate lateral movement of said blade in a direction transverse to its direction of actuation as required in positioning said box unit upon said valve body.

3. A gate valve assembly comprising a valve body having a fluid passage therethrough, a valve seat secured to the wall of said passage, a gate blade projecting from said passage through an opening in said body and [adjustable laterally to locate] *having* a side surface [of said blade] in sliding sealing engagement with said valve seat to control the flow of fluid through said passage, a packing box unit having a slot therethrough for receiving said gate blade, a sliding seal between said packing box unit and said gate blade within said slot, a surface on said packing box unit for supporting said unit upon said valve body, a complementary surface on said valve body surrounding said opening for sliding engagement with said surface on said box unit whereby said box unit may be shifted upon said complementary surface to a position wherein said slot in said box unit is in a desired alignment with said valve seat, and means for releasably clamping said last mentioned surfaces into sealing engagement with each other in said position.

References Cited in the file of this patent or the original patent

UNITED STATES PATENTS

| | | |
|---|---|---|
| 744,214 | Lowe | Nov. 17, 1903 |
| 1,348,993 | Hahn | Aug. 10, 1920 |
| 2,000,853 | Lange | May 7, 1935 |
| 2,064,567 | Riley | Dec. 15, 1936 |
| 2,219,064 | Boyer | Oct. 22, 1940 |
| 2,341,018 | Clapp | Feb. 8, 1944 |
| 2,502,977 | Meynig | Apr. 4, 1950 |

FOREIGN PATENTS

| | | |
|---|---|---|
| 719,920 | Germany | 1942 |